(12) United States Patent
Kim et al.

(10) Patent No.: US 9,691,337 B2
(45) Date of Patent: Jun. 27, 2017

(54) DIGITAL GAMMA CORRECTION PART, DISPLAY APPARATUS HAVING THE SAME AND METHOD OF DRIVING DISPLAY PANEL USING THE SAME

(71) Applicant: Samsung Display Co., LTD., Yongin, Gyeonggi-Do (KR)

(72) Inventors: Ho-In Kim, Seoul (KR); Young-Sun Kwak, Cheonan-si (KR); Jun-Ho Hwang, Asan-si (KR)

(73) Assignee: Samsung Display Co., Ltd. (KR)

( * ) Notice: Subject to any disclaimer, the term of this patent is extended or adjusted under 35 U.S.C. 154(b) by 68 days.

(21) Appl. No.: 14/459,200

(22) Filed: Aug. 13, 2014

(65) Prior Publication Data

US 2015/0206485 A1 Jul. 23, 2015

(30) Foreign Application Priority Data

Jan. 21, 2014 (KR) ........................ 10-2014-0007294

(51) Int. Cl.
*G09G 3/36* (2006.01)
*G02F 1/1335* (2006.01)
*G09G 3/00* (2006.01)

(52) U.S. Cl.
CPC ......... *G09G 3/3607* (2013.01); *G09G 3/3648* (2013.01); *G02F 1/1336* (2013.01); *G09G 3/006* (2013.01); *G09G 2320/0233* (2013.01); *G09G 2320/0276* (2013.01); *G09G 2320/0673* (2013.01)

(58) Field of Classification Search
CPC ......... G09G 3/3607; G09G 2320/0233; G09G 2320/0276; G09G 2320/0673
USPC ........................................... 345/690
See application file for complete search history.

(56) References Cited

U.S. PATENT DOCUMENTS

| 6,160,532 | A | 12/2000 | Kaburagi et al. |
| 6,795,063 | B2 | 9/2004 | Endo et al. |
| 6,798,368 | B2 | 9/2004 | Jung et al. |
| 7,768,577 | B2 | 8/2010 | Shin |

(Continued)

FOREIGN PATENT DOCUMENTS

| JP | 2005-181751 | 7/2005 |
| JP | 2011-123163 | 6/2011 |

(Continued)

*Primary Examiner* — Chanh Nguyen
*Assistant Examiner* — Daniel Duong
(74) *Attorney, Agent, or Firm* — Innovation Counsel LLP

(57) ABSTRACT

A digital gamma correction part includes a memory and a selector. The memory is configured to store a basic gamma reference data, a first compensated gamma reference data and a second compensated gamma reference data, where respective data of the first compensated gamma reference data are greater than respective data of the basic gamma reference data, and respective data of the second compensated gamma reference data are less than respective data of the basic gamma reference data. The selector is configured to receive a luminance data determined based on a luminance of a display panel, and to output a gamma reference data by selecting one from the basic gamma reference data, the first compensated gamma reference data and the second compensated gamma reference data based on the luminance data and a gamma converted reference range.

10 Claims, 10 Drawing Sheets

(56) References Cited

U.S. PATENT DOCUMENTS

| | | | |
|---|---|---|---|
| 8,077,188 B2 | 12/2011 | Muraji et al. | |
| 8,264,446 B2 | 9/2012 | Lee et al. | |
| 2007/0057975 A1* | 3/2007 | Oh | G09G 3/3648 345/690 |
| 2008/0074372 A1* | 3/2008 | Baba | G09G 3/3406 345/89 |
| 2009/0231256 A1 | 9/2009 | Kim | |
| 2011/0216098 A1* | 9/2011 | Choi | G09G 5/10 345/690 |
| 2013/0271507 A1* | 10/2013 | Kim | G09G 3/3291 345/690 |
| 2015/0091949 A1* | 4/2015 | Kim | G09G 3/3648 345/690 |

FOREIGN PATENT DOCUMENTS

| | | |
|---|---|---|
| KR | 10-2006-0022147 | 3/2006 |
| KR | 10-2007-0099800 | 10/2007 |
| KR | 10-0781306 | 11/2007 |
| KR | 10-2008-0067843 | 7/2008 |
| KR | 10-2009-0088737 | 8/2009 |
| KR | 10-2011-0075476 | 7/2011 |
| KR | 10-2012-0041867 | 5/2012 |
| KR | 10-2012-0072724 | 7/2012 |

\* cited by examiner

DIGITAL GAMMA CORRECTION PART, DISPLAY APPARATUS HAVING THE SAME AND METHOD OF DRIVING DISPLAY PANEL USING THE SAME

This application claims priority to Korean Patent Application No. 10-2014-0007294, filed on Jan. 21, 2014, and all the benefits accruing therefrom under 35 U.S.C. §119, the content of which is herein incorporated by reference in its entireties.

BACKGROUND

1. Field

Exemplary embodiments of the inventive concept relate to a digital gamma correction part, a display apparatus having the digital gamma correction part and a method of driving a display panel using the digital gamma correction part. More particularly, exemplary embodiments of the inventive concept relate to a digital gamma correction part improving display quality, a display apparatus having the digital gamma correction part, and a method of driving a display panel using the digital gamma correction part.

2. Description of the Related Art

A flat panel display ("FPD") may be used as a display apparatus. The flat panel display may be a large, thin and/or lightweight display device. Examples of the flat panel display include, but are not limited to, a liquid crystal display ("LCD"), a plasma display panel ("PDP") and an organic light emitting display ("OLED").

The display apparatus may display a digital image data in a display panel by converting the digital image data to an analog data such as a data voltage, so that a viewer may view an image.

For example, in the liquid crystal display apparatus, an angle of an alignment of a liquid crystal molecule of a liquid crystal layer may be controlled by controlling a level of the data voltage which is applied in a pixel electrode of the liquid crystal display apparatus. Thus, the liquid crystal display apparatus may control an intensity of light which passes through the liquid crystal layer, and may control a grayscale of a displayed color.

The liquid crystal layer may be manufactured by plural steps. Major processes of the steps are categorized into a thin film transistor ("TFT") process, a color filter ("CF") process and a liquid crystal ("LC") process. A major factor which affects a display quality of the liquid crystal display apparatus may be the TFT process. Thus, a unique gamma characteristic of the liquid crystal display panel may be affected by the TFT process. In the TFT process, an exposure amount of the liquid crystal panel may not be uniform because a substrate used for manufacturing the liquid crystal panel becomes large. The difference of the exposure amount may generate a difference of irradiation amount and change of a display characteristic. Thus, gamma distortion may occur.

SUMMARY

One or more exemplary embodiment of the inventive concept provides a digital gamma correction part capable of decreasing a gamma trend.

One or more exemplary embodiment of the inventive concept also provides a display apparatus having the digital gamma correction part.

One or more exemplary embodiment of the inventive concept also provides a method of driving a display panel using the digital gamma correction part.

According to an exemplary embodiment, a digital gamma correction part includes a memory and a selector. The memory is configured to store a basic gamma reference data, a first compensated gamma reference data and a second compensated gamma reference data, where respective data of the first compensated gamma reference data are greater than respective data of the basic gamma reference data, and respective data of the second compensated gamma reference data are less than respective data of the basic gamma reference data. The selector is configured to receive a luminance data determined based on a luminance of a display panel, and to output a gamma reference data by selecting one from the basic gamma reference data, the first compensated gamma reference data and the second compensated gamma reference data based on the luminance data and a predetermined gamma converted reference range.

In an exemplary embodiment, the luminance data may include a plurality of luminance values corresponding to grayscale levels, respectively. The selector may include a convertor and a comparator. The convertor is configured to convert the luminance values to a plurality of gamma converted values, respectively. The comparator is configured to compare the gamma converted values with the predetermined gamma converted reference range.

In an exemplary embodiment, when the gamma converted values are within the predetermined gamma converted reference range, the selector may be configured to select the basic gamma reference data, when a minimum of the gamma converted value is less than a minimum value of the predetermined gamma converted reference range, the selector may be configured to select the first compensated gamma reference data, and when a maximum gamma converted value is greater than a maximum value of the predetermined gamma converted reference range, the selector may be configured to select the second compensated gamma reference data.

In an exemplary embodiment, the memory may be configured to further store a third compensated gamma reference data and a fourth compensated gamma reference data. The basic gamma reference data may include digital data corresponding to a predetermined basic gamma reference voltage. The respective data of the first compensated gamma reference data are greater than the respective data of the basic gamma reference data by one grayscale level. Respective data of the third compensated gamma reference data are greater than the respective data of the basic gamma reference data by two grayscale levels. The respective data of the second compensated gamma reference data are less than the respective data of the basic gamma reference data by one grayscale level. Respective data of the fourth compensated gamma reference data are less than the respective data of the basic gamma reference data by two grayscale levels.

In an exemplary embodiment, when the gamma converted values is within the predetermined gamma converted reference range, the selector maybe configured to select the basic gamma reference data, when a minimum of the gamma converted value is less than a minimum value of the predetermined gamma converted reference range and is greater than or equal to a first lower bound, the selector may be configured to select the first compensated gamma reference data, when the minimum of the gamma converted value is less than the first lower bound, the selector may be configured to select the third compensated gamma reference data, when a maximum gamma converted value is greater than a maximum value of the predetermined gamma converted reference range and is less than or equal to a first upper bound, the selector may be configured to select the second compensated gamma reference data, and when the maximum gamma converted value is greater than the first upper bound, the selector may be configured to select the fourth compensated gamma reference data.

In an exemplary embodiment, the memory may include a first lookup table including the first compensated gamma reference data, a second lookup table including the second compensated gamma reference data, a third lookup table including the third compensated gamma reference data, a fourth lookup table including the fourth compensated gamma reference data, and a fifth lookup table including the basic gamma reference data.

In an exemplary embodiment, the gamma converted value may include a logarithm of a first variable, the logarithm having a base of a second variable. The first variable may be the luminance value divided by a maximum luminance value corresponding to a maximum level of the grayscale, and the second variable may be the level of the grayscale divided by the maximum level of the grayscale.

In an exemplary embodiment, the selector may be configured to output the gamma reference data to the memory. The memory may be configured to store the gamma reference data as the basic gamma reference data.

In an exemplary embodiment, the luminance data may be determined based on a luminance of a center of the display panel.

According to an exemplary embodiment, a display apparatus includes a display panel, a digital gamma correction part, a gamma reference voltage generator and a data driver. The display panel is configured to display an image. The digital gamma correction part includes a memory and a selector. The memory is configured to store a basic gamma reference data, a first compensated gamma reference data and a second compensated gamma reference data, where respective data of the first compensated gamma reference data are greater than respective data of the basic gamma reference data, and respective data of the second compensated gamma reference data are less than respective data of the basic gamma reference data. The selector is configured to receive a luminance data determined based on a luminance of the display panel, and to output a gamma reference data by selecting one from the basic gamma reference data, the first compensated gamma reference data and the second compensated gamma reference data based on the luminance data and a predetermined gamma converted reference range. The gamma reference voltage generator is configured to generate a gamma reference voltage based on the gamma reference data. The data driver is configured to generate a data voltage using the gamma reference voltage to output the data voltage to the display panel.

In an exemplary embodiment, the luminance data may include a plurality of luminance values corresponding to grayscale levels, respectively, the selector may include a convertor configured to convert the luminance values to a plurality of gamma converted values, respectively, and a comparator configured to compare the gamma converted values with the predetermined gamma converted reference range, when the gamma converted values are within the predetermined gamma converted reference range, the selector may be configured to select the basic gamma reference data, when a minimum of the gamma converted value is less than a minimum value of the predetermined gamma converted reference range, the selector may be configured to select the first compensated gamma reference data, and when a maximum gamma converted value is greater than a maximum value of the predetermined gamma converted reference range, the selector may be configured to select the second compensated gamma reference data.

According to an exemplary embodiment, a method of driving a display panel, the method includes storing a basic gamma reference data, a first compensated gamma reference data and a second compensated gamma reference data, where respective data of the first compensated gamma reference data are greater than respective data of the basic gamma reference data, and respective data of the second compensated gamma reference data are less than respective data of the basic gamma reference data, selecting a gamma reference data from the basic gamma reference data, the first compensated gamma reference data and the second compensated gamma reference data according to a luminance data determined based on a luminance of the display panel and a predetermined gamma converted reference range, and generating a gamma reference voltage based on the gamma reference data.

In an exemplary embodiment, the luminance data may include a plurality of luminance values corresponding to grayscale levels, respectively. The selecting the gamma reference data may include converting the luminance values to a plurality of gamma converted values, respectively, and comparing the gamma converted values with the predetermined gamma converted reference range.

In an exemplary embodiment, when the gamma converted values are within the predetermined gamma converted reference range, the basic gamma reference data may be selected as the gamma reference data, when a minimum of the gamma converted value is less than a minimum value of the predetermined gamma converted reference range, the first compensated gamma reference data may be selected as the gamma reference data, when a maximum gamma converted value is greater than a maximum value of the predetermined gamma converted reference range, the second compensated gamma reference data may be selected as the gamma reference data.

In an exemplary embodiment, the method further includes storing a third compensated gamma reference data and a fourth compensated gamma reference data. The basic gamma reference data may include digital data corresponding to a predetermined basic gamma reference voltage. The respective data of the first compensated gamma reference data may be greater than the respective data of the basic gamma reference data by one grayscale level. Respective data of the third compensated gamma reference data may be greater than the respective data of the basic gamma reference data by two grayscale levels. The respective data of the second compensated gamma reference data may be less than the respective data of the basic gamma reference data by one grayscale level. Respective data of the fourth compensated gamma reference data may be less than the respective data of the basic gamma reference data by two grayscale levels.

In an exemplary embodiment, when the gamma converted values are within the predetermined gamma converted reference range, the basic gamma reference data are selected as the gamma reference data, when a minimum of the gamma converted value is less than a minimum value of the predetermined gamma converted reference range and is greater than or equal to a first lower bound, the first compensated gamma reference data may be selected as the gamma reference data, when the minimum of the gamma converted value is less than the first lower bound, the third compensated gamma reference data may be selected as the gamma reference data, when a maximum gamma converted value is greater than a maximum value of the predetermined gamma converted reference range and is less than or equal to a first upper bound, the second compensated gamma reference data may be selected as the gamma reference data, and when the maximum gamma converted value is greater than the first upper bound, the fourth compensated gamma reference data may be selected as the gamma reference data.

In an exemplary embodiment, the gamma converted value may include a logarithm of a first variable, the logarithm having a base of a second variable. The first variable may be the luminance value divided by a maximum luminance value corresponding to a maximum level of the grayscale, and the second variable may be the level of the grayscale divided by the maximum level of the grayscale.

In an exemplary embodiment, the method may further include resetting the basic gamma reference data in accordance with the selected gamma reference data.

In an exemplary embodiment, the storing the basic gamma reference data, the first compensated gamma reference data and the second compensated gamma reference data, the selecting the gamma reference data, the generating the gamma reference voltage, and the resetting the basic gamma reference data may be repeated until the stored basic gamma reference data are selected as the gamma reference data.

In an exemplary embodiment, the luminance data may be determined based on a luminance of a center of the display panel.

According to one or more exemplary embodiment of the digital gamma correction part, the display apparatus having the digital gamma correction part and the method of driving the display panel using the digital gamma correction part, the digital gamma correction part may control a gamma reference data which are base of gamma reference voltages according to a luminance detected on a display panel. Thus, a display quality of the display apparatus may be improved.

BRIEF DESCRIPTION OF THE DRAWINGS

The above and other features and advantages of the inventive concept will become more apparent by describing in detailed exemplary embodiments thereof with reference to the accompanying drawings, in which.

DETAILED DESCRIPTION

Hereinafter, the inventive concept will be explained in detail with reference to the accompanying drawings.

Figure 1:
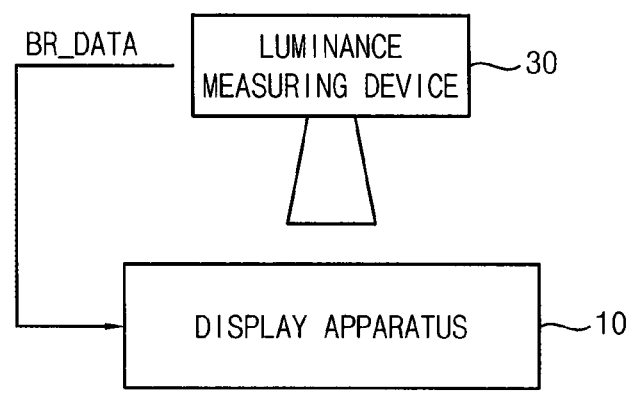
FIG. 1 is a block diagram illustrating a display apparatus and a luminance measuring device according to an exemplary embodiment of the inventive concept.
Figure 2:
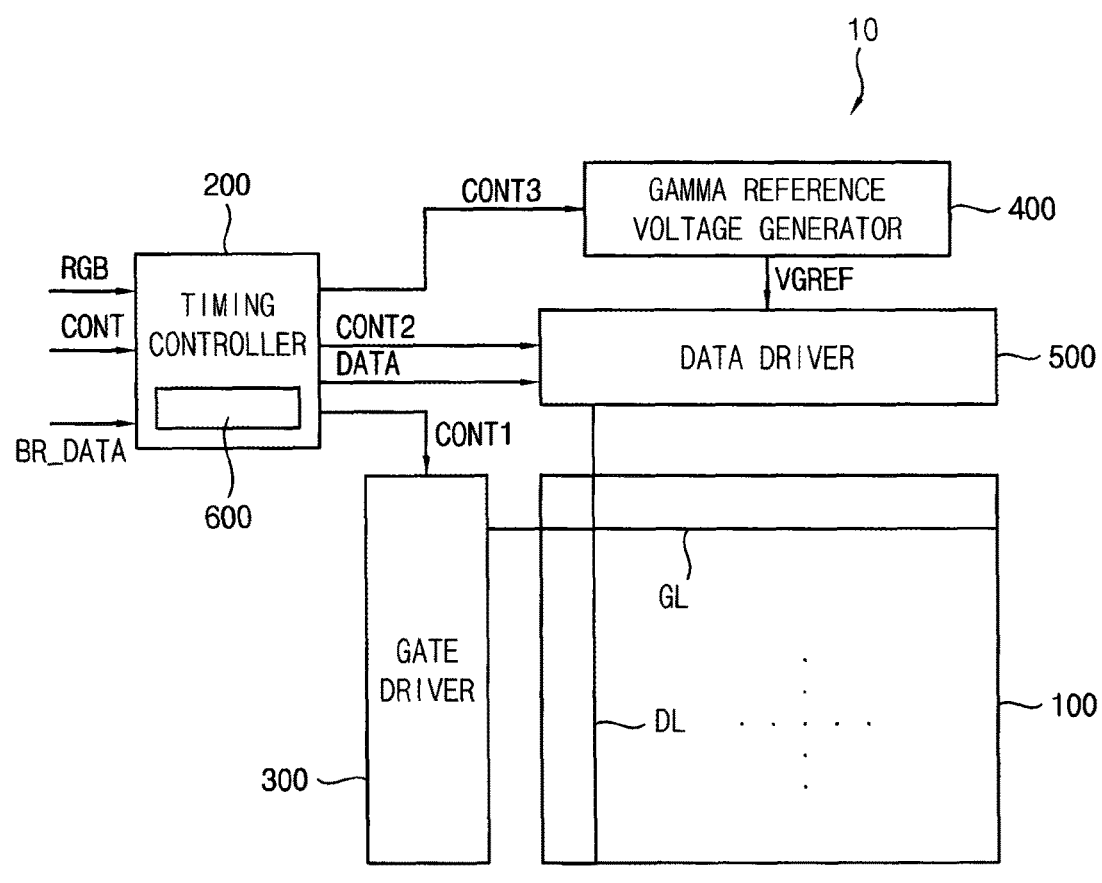
FIG. 2 is a block diagram illustrating the display apparatus of FIG. 1.

FIG. 1 is a block diagram illustrating a display apparatus and a luminance measuring device according to an exemplary embodiment of the inventive concept. FIG. 2 is a block diagram illustrating the display apparatus of FIG. 1.

Referring FIGS. 1 and 2, the luminance measuring device 30 may measure a luminance data BR_DATA determined based on a luminance of a display panel 100 of the display apparatus 10 and output the luminance data BR_DATA to a timing controller 200. For example, the luminance measuring device 30 may measure a luminance of a center of the display panel 100. The luminance data BR_DATA may include a plurality of luminance values which correspond to respective grayscale levels.

In the present exemplary embodiment, the display apparatus 10 may have 256 grayscale levels. Thus, the luminance data BR_DATA may have 256 luminance values corresponding to the 256 grayscale levels. Alternatively, the display apparatus 10 may have grayscale levels greater than or less than 256 levels.

The display apparatus 10 may be temporally connected to the luminance measuring device 30 while measuring the luminance data BR_DATA of the display panel 100, and may receive the luminance data BR_DATA from the luminance measuring device 30. For example, the display apparatus 10 may be temporally connected to the luminance measuring device 30 in manufacturing processes, and may receive the luminance data BR_DATA from the luminance measuring device 30. The display apparatus 10 may be connected to the luminance measuring device 30 by I2C interface protocol, and may receive the luminance data BR_DATA. The display apparatus 10 may be disconnected from the luminance measuring device 30 after receiving the luminance data BR_DATA.

The display apparatus 10 includes the display panel 100 and a panel driver. The panel driver includes a timing controller 200, a gate driver 300, a gamma reference voltage generator 400 and a data driver 500.

The display panel 100 displays an image. The display panel 100 has a display region on which an image is displayed and a peripheral region adjacent to the display region.

The display panel 100 includes a plurality of gate lines GL, a plurality of data lines DL and a plurality of unit pixels connected to the gate lines GL and the data lines DL. The gate lines GL extend in a first direction D1 and the data lines DL extend in a second direction D2 crossing the first direction D1.

Each unit pixel includes a switching element (not shown), a liquid crystal capacitor (not shown) and a storage capacitor (not shown). The liquid crystal capacitor and the storage capacitor are electrically connected to the switching element. The unit pixels may be disposed in a matrix form.

The timing controller 200 receives input image data RGB and an input control signal CONT from an external apparatus (not shown), and receives the luminance data BR_DATA from the luminance measuring device 30. The input image data RGB may include red image data, green image data and blue image data. The input control signal CONT may include a master clock signal and a data enable signal. The input control signal CONT may further include a vertical synchronizing signal and a horizontal synchronizing signal. The luminance data BR_DATA may include the luminance values corresponding to the grayscale levels, respectively.

The timing controller 200 generates a first control signal CONT1, a second control signal CONT2, a third control signal CONT3 and a data signal DATA based on the input image data RGB, the input control signal CONT and the luminance data BR_DATA.

The timing controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The timing controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The timing controller 200 generates the data signal DATA based on the input image data RGB. The timing controller 200 outputs the data signal DATA to the data driver 500.

The timing controller 200 generates the third control signal CONT3 for controlling an operation of the gamma reference voltage generator 400 based on the input control signal CONT and the luminance data BR_DATA, and outputs the third control signal CONT3 to the gamma reference voltage generator 400. The timing controller may include a digital gamma correction part which generates a gamma reference data based on the luminance data BR_DATA. The third control signal CONT3 may include the gamma reference data. The digital gamma correction part is explained in detail referring to FIG. 3.

The gate driver 300 generates gate signals driving the gate lines GL in response to the first control signal CONT1 received from the timing controller 200. The gate driver 300 sequentially outputs the gate signals to the gate lines GL.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level of the data signal DATA.

In the present exemplary embodiment, the gamma reference voltage VGREF has 7 first polarity gamma reference voltages and 7 second polarity gamma reference voltages. The first polarity gamma reference voltages and the second polarity gamma reference voltages may include a voltage which corresponds to at least one grayscale level of first to 256th grayscale level.

The first polarity gamma reference voltages are symmetrical to the second polarity gamma reference voltages with respect to a common voltage. Alternatively, the gamma reference voltage VGREF may have a plurality of the first polarity gamma reference voltages and the second polarity gamma reference voltages in accordance with characteristics of the display apparatus 10.

The gamma reference voltage generator 400 may be disposed in the timing controller 200 or in the data driver 500.

The data driver 500 receives the second control signal CONT2 and the data signal DATA from the timing controller 200, and receives the gamma reference voltages VGREF from the gamma reference voltage generator 400. The data driver 500 converts the data signal DATA into analog data voltages using the gamma reference voltages VGREF. The data driver 500 outputs the data voltages to the data lines DL.

Figure 3:
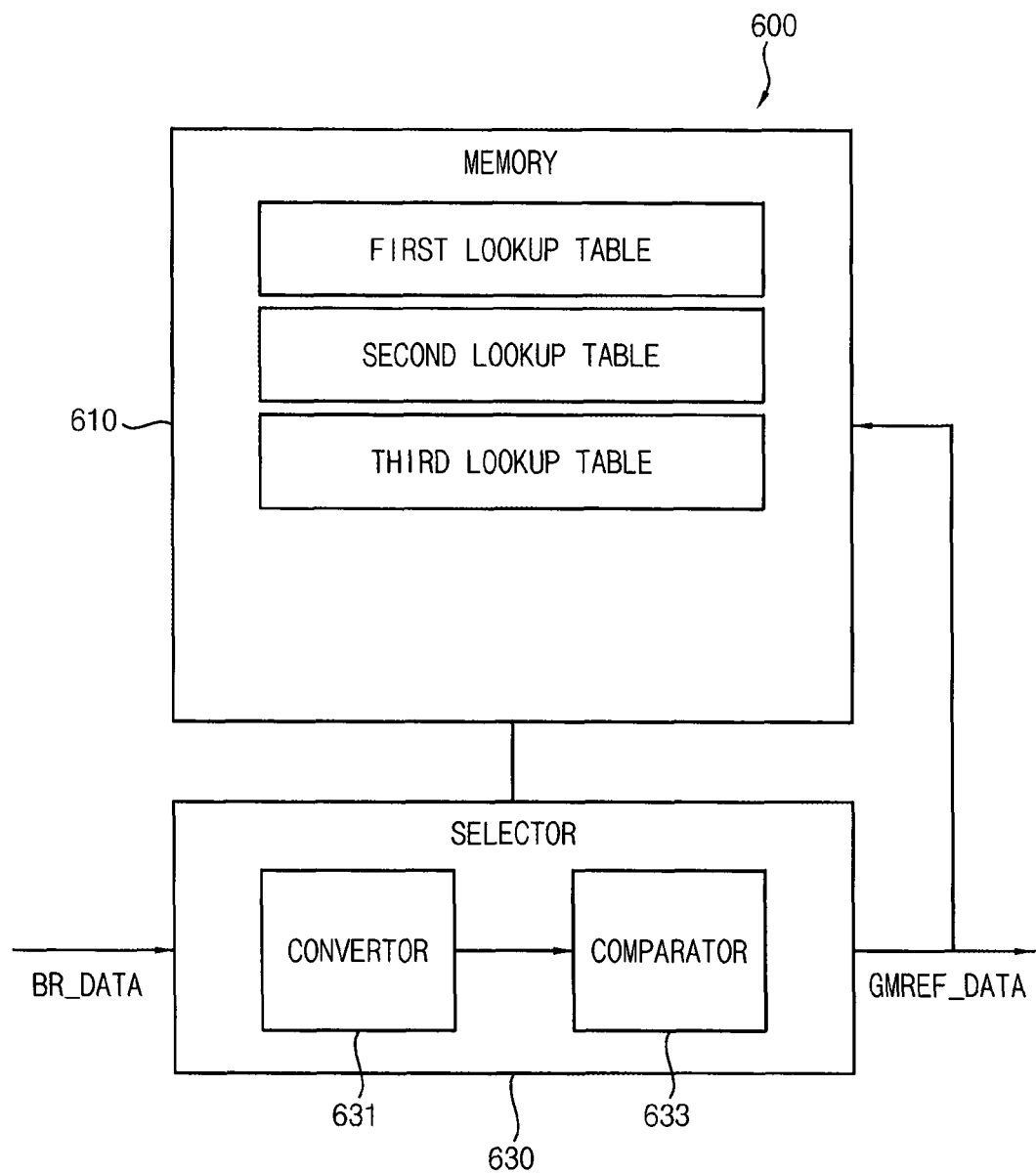
FIG. 3 is a block diagram illustrating a digital gamma correction part according to an exemplary embodiment of the inventive concept.

FIG. 3 is a block diagram illustrating a digital gamma correction part according to an exemplary embodiment of the inventive concept.

Referring to FIGS. 1 to 3, the timing controller 200 may include the digital gamma correction part 600. Alternatively, the digital gamma correction part 600 may be separated from the timing controller 200.

The digital gamma correction part 600 includes a memory 610 and a selector 630.

The memory 610 may stores a basic gamma reference data, a first compensated gamma reference data and a second compensated gamma reference data.

The basic gamma reference data may have digital values corresponding to the gamma reference voltages.

The basic gamma reference data may include first polarity gamma reference data corresponding to the first polarity gamma reference voltages and second polarity gamma reference data corresponding to the second polarity gamma reference voltages. The first polarity gamma reference data may have values from zero to 255. The second polarity gamma reference data may have values from zero to 255. The values from zero to 255 correspond to the 256 grayscale levels, respectively.

The respective data of the first compensated gamma reference data may be greater than the respective data of the basic gamma reference data by one grayscale level. For example, the respective data of the first compensated gamma reference data are greater than the respective data of the basic gamma reference data by one. Alternatively, the respective data of the first compensated gamma reference data may be greater than the respective data of the basic gamma reference data by two or more grayscale levels.

The respective data of the second compensated gamma reference data may be less than the respective data of the basic gamma reference data by one grayscale level. For example, the respective data of the first compensated gamma reference data are less than the respective data of the basic gamma reference data by one. Alternatively, the respective data of the first compensated gamma reference data may be less than the respective data of the basic gamma reference data by two or more grayscale levels.

The memory may include a first lookup table including the first compensated gamma reference data, a second lookup table including the second compensated gamma reference data and a third lookup table including the basic gamma reference data.

The selector 630 may receive the luminance data BR_DATA and may compare the luminance data BR_DATA with a predetermined gamma reference range. The selector 630 may output a gamma reference data GMREF_DATA by selecting one from the basic gamma reference data, the first compensated gamma reference data and the second compensated gamma reference data based on a result of the comparison.

The selector 630 may include a convertor 631 and a comparator 633.

The convertor 631 may convert the luminance data BR_DATA to a plurality of gamma converted values. For example, the convertor 631 may convert the luminance values of the luminance data BR_DATA to the gamma converted values, respectively. The gamma converted values may include log transformed values of the luminance values.

The luminance value may have the same number of luminance value as the grayscale level.

The gamma converted value may include a logarithm of a first variable which has a base of a second variable. The second variable may be determined based on the n-th grayscale level divided by the maximum grayscale level.

The first variable may be determined based on the n-th luminance value divided by a maximum luminance value corresponding to the maximum grayscale level. For example, the gamma converted value may be determined based on a logarithm function such as $\log_a(X)$. The 'X' is the first variable and 'a' is the second variable.

The gamma reference range may include a predetermined gamma converted reference range. An upper bound of the predetermined gamma converted reference range may be about 2.3. A lower bound of the predetermined gamma converted reference range may be about 2.1. A center of the predetermined gamma converted reference range may be about 2.2.

The comparator 633 may compare the gamma converted values with the gamma converted reference range, and may output a result of the comparison.

Figure 4:
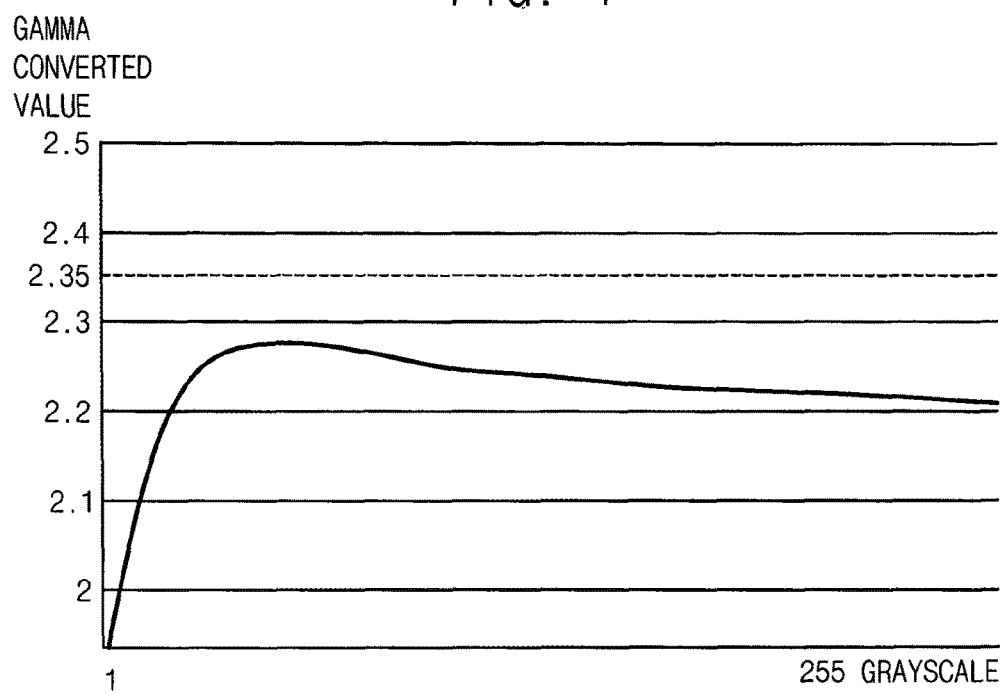
FIG. 4 is a graph showing gamma converted values, when the gamma converted values are within a gamma converted reference range.

FIG. 4 is a graph showing gamma converted values, when the gamma converted values are within a gamma converted reference range.

Referring to FIGS. 3 and 4, the gamma converted values are within the predetermined gamma converted reference range except for a range having a low gray scale in which the gamma converted value increases rapidly.

The comparator 633 may output zero as a result of comparison when the gamma converted values are within the predetermined gamma converted reference range except for a range in which the gamma converted value increases rapidly.

The selector 630 may select the basic gamma reference data and output the basic gamma reference data as the gamma reference data GMREF_DATA when the result of comparison is zero.

Figure 5:
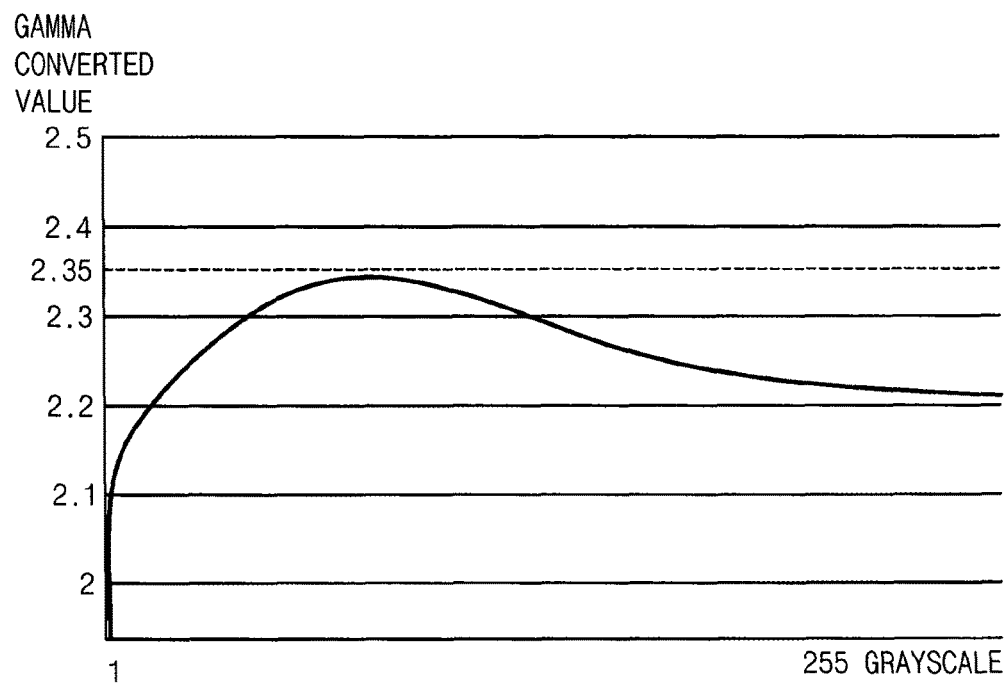
FIG. 5 is a graph showing gamma converted values, when a maximum gamma converted value is greater than a maximum value of the gamma converted reference range.

FIG. 5 is a graph showing gamma converted values, when a maximum gamma converted value is greater than a maximum value of the gamma converted reference range.

Referring to FIGS. 3 and 5, the gamma converted values has a region in which the gamma converted value is greater than the predetermined gamma converted reference range when the gray scale is low.

When the maximum gamma converted value is greater than the maximum of the predetermined gamma converted reference range, the comparator 633 may output a difference value of subtracting an upper bound of the predetermined gamma converted reference range from the maximum gamma converted value.

When the difference value is greater than zero, the selector 630 may select the second compensated gamma reference data and output the second compensated gamma reference data as the gamma reference data GMREF_DATA.

Figure 6:
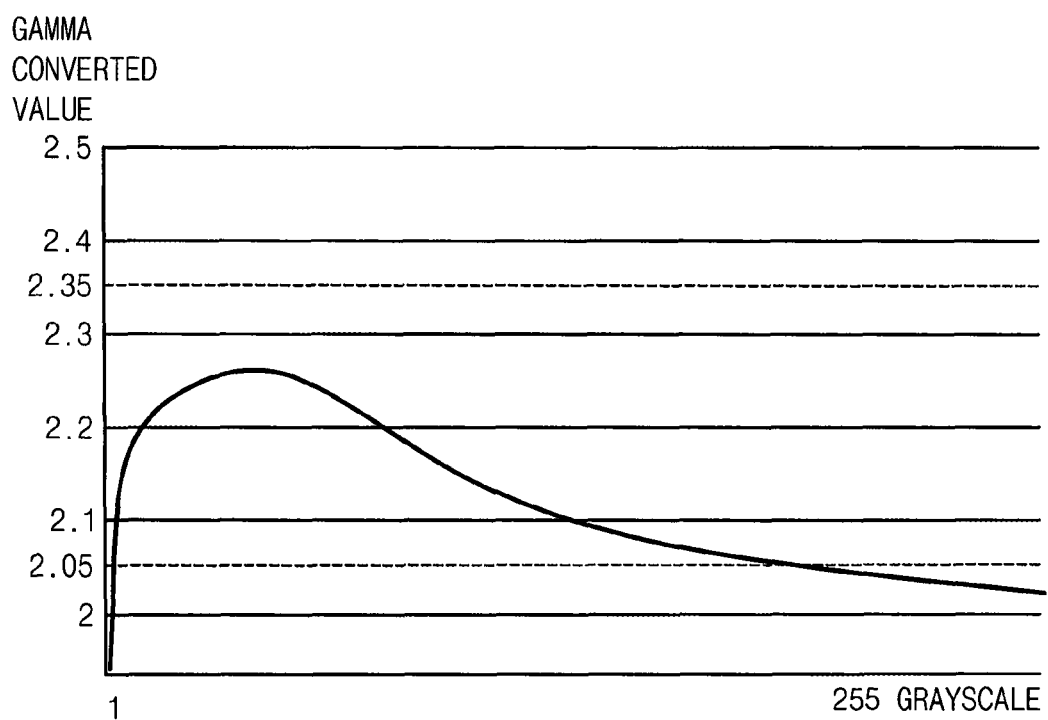
FIG. 6 is a graph showing gamma converted values, when a minimum gamma converted value is less than a minimum value of the gamma converted reference range.

FIG. 6 is a graph showing gamma converted values, when a minimum gamma converted value is less than a minimum value of the gamma converted reference range.

Referring to FIGS. 3 and 6, a minimum gamma converted value of the gamma converted values is less than a minimum of the predetermined gamma converted reference range when the gray scale is high.

When the minimum gamma converted value is less than the gamma converted reference range, the comparator 633 may output a difference value of subtracting a lower bound of the predetermined gamma converted reference range from the minimum gamma converted value.

When the difference value is less than zero, the selector 630 may select the first compensated gamma reference data and output the first compensated gamma reference data as the gamma reference data GMREF_DATA.

Referring again to FIGS. 2 and 3, the memory 610 may store the gamma reference data GMREF_DATA which is selected by the selector 630 as the basic gamma reference data.

The timing controller 200 generates the third control signal CONT3 for controlling an operation of the gamma reference voltage generator 400 based on the input control signal CONT and the luminance data BR_DATA, and outputs the third control signal CONT3 to the gamma reference voltage generator 400. The third control signal CONT3 may include the gamma reference data GMREF_DATA.

The gamma reference voltage generator 400 generates the gamma reference voltage VGREF based on the gamma reference data GMREF_DATA.

Figure 7:
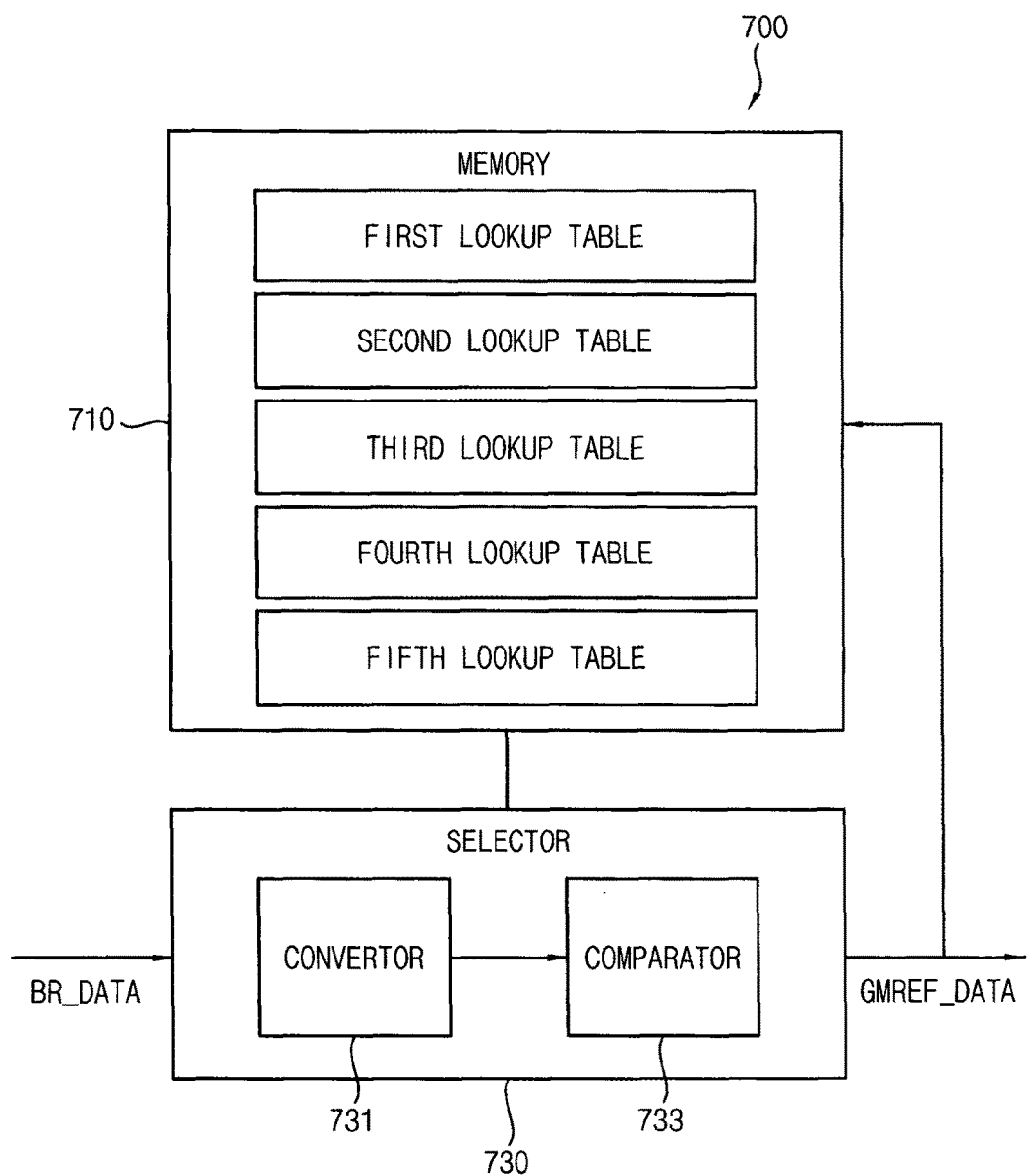
FIG. 7 is a block diagram illustrating a digital gamma correction part according to an exemplary embodiment of the inventive concept.

FIG. 7 is a block diagram illustrating a digital gamma correction part according to an exemplary embodiment of the inventive concept.

The display apparatus according to the illustrated exemplary embodiment is substantially the same as the display apparatus in FIGS. 1 to 3 except for a digital gamma correction part 700. Thus, the same reference numerals will be used to refer to same or like parts as those described in with reference to FIGS. 1 to 3 and any further repetitive explanation concerning the above elements will be omitted.

Referring to FIGS. 1, 2 and 4 to 7, the timing controller 200 may include the digital gamma correction part 700. Alternatively, the digital gamma correction part 700 may be separated from the timing controller 200.

The digital gamma correction part 700 includes a memory 710 and a selector 730.

The memory 710 may stores a basic gamma reference data, a first compensated gamma reference data, a second compensated gamma reference data, a third compensated gamma reference data and a fourth gamma reference data.

The basic gamma reference data may have digital values corresponding to the basic gamma reference voltages.

The basic gamma reference data may include first polarity gamma reference data corresponding to the first polarity gamma reference voltages and second polarity gamma reference data corresponding to the second polarity gamma reference voltages. The first polarity gamma reference data may have values from zero to 255. The second polarity gamma reference data may have values from zero to 255. The values from zero to 255 correspond to the 256 grayscale levels, respectively.

The respective data of the first compensated gamma reference data may be greater than the respective data of the basic gamma reference data by one grayscale level. For example, the respective data of the first compensated gamma reference data are greater than the respective data of the basic gamma reference data by one.

The respective data of the third compensated gamma reference data may be greater than the respective data of the basic gamma reference data by two grayscale levels. For example, the respective data of the first compensated gamma reference data are greater than the respective data of the basic gamma reference data by two.

The respective data of the second compensated gamma reference data may be less than the respective data of the basic gamma reference data by one grayscale level. For example, the respective data of the first compensated gamma reference data are less than the respective data of the basic gamma reference data by one.

The respective data of the fourth compensated gamma reference data may be less than the respective data of the basic gamma reference data by two grayscale levels. For example, the respective data of the first compensated gamma reference data are less than the respective data of the basic gamma reference data by two.

The memory may include a first lookup table including the first compensated gamma reference data, a second lookup table including the second compensated gamma reference data, a third lookup table including the third compensated gamma reference data, a fourth lookup table including the fourth compensated gamma reference data, and a fifth lookup table including the basic gamma reference data.

The selector 730 may include a convertor 731 and a comparator 733.

The convertor 731 may convert the luminance data BR_DATA to a plurality of gamma converted values.

For example, the convertor 731 may convert the luminance values of the luminance data BR_DATA to the gamma converted values, respectively. The gamma converted values may include log transformed values of the luminance values.

The luminance value may have an n-th luminance value corresponding to an n-th grayscale level. The 'n' is a natural number, and less than or equal to a maximum grayscale level.

The gamma converted value may include a logarithm of a first variable which has a base of a second variable. The second variable may be determined based on the n-th grayscale level divided by the maximum grayscale level.

The first variable may be determined based on the n-th luminance value divided by a maximum luminance value corresponding to the maximum grayscale level. For example, the gamma converted value may be determined based on a logarithm function such as $\log_a(X)$. The 'X' is the first variable and 'a' is the second variable.

The gamma reference range may include a predetermined gamma converted reference range. An upper bound of the predetermined gamma converted reference range may be about 2.3. A lower bound of the predetermined gamma converted reference range may be about 2.1. A center of the predetermined gamma converted reference range may be about 2.2.

The comparator 733 may compare the gamma converted values with the predetermined gamma converted reference range, and may output a result of the comparison.

Referring FIGS. 4 and 7, the gamma converted values are within the predetermined gamma converted reference range except for a range having a low gray scale in which the gamma converted value increases rapidly.

The comparator 733 may output zero as a result of comparison when the gamma converted values are within the predetermined gamma converted reference range except for a range in which the gamma converted value increases rapidly.

The selector 730 may select the basic gamma reference data and output the basic gamma reference data as the gamma reference data GMREF_DATA when the result of comparison is zero.

Referring FIGS. 5 and 7, the gamma converted values has a region in which the gamma converted value is greater than the predetermined gamma converted reference range when the gray scale is low.

When the maximum gamma converted value is greater than the predetermined gamma converted reference range, the comparator 733 may output a difference value of subtracting an upper bound of the predetermined gamma converted reference range from the maximum gamma converted value.

When the difference value is greater than zero and less than or equal to 0.05, the selector 730 may select the second compensated gamma reference data and output the second compensated gamma reference data as the gamma reference data GMREF_DATA.

When the difference value is greater than 0.05, the selector 730 may select the fourth compensated gamma reference data and output the fourth compensated gamma reference data as the gamma reference data GMREF_DATA.

Referring FIGS. 6 and 7, a minimum gamma converted value of the gamma converted values is less than the predetermined gamma converted reference range when the gray scale is high.

When the minimum gamma converted value is less than the predetermined gamma converted reference range, the comparator 733 may output the difference value of subtracting the lower bound of the predetermined gamma converted reference range from the minimum gamma converted value.

When the result of comparison is greater than or equal to −0.05 and less than zero, the selector 730 may select the first compensated gamma reference data and output the first compensated gamma reference data as the gamma reference data GMREF_DATA.

When the result of comparison is less than −0.05, the selector 730 may select the third compensated gamma reference data and output the third compensated gamma reference data as the gamma reference data GMREF_DATA.

Referring again to FIGS. 2 and 7, the timing controller 200 generates the third control signal CONT3 for controlling an operation of the gamma reference voltage generator 400 based on the input control signal CONT and the luminance data BR_DATA, and outputs the third control signal CONT3 to the gamma reference voltage generator 400. The third control signal CONT3 may include the gamma reference data GMREF_DATA.

The gamma reference voltage generator 400 generates a gamma reference voltage VGREF according to the gamma reference data GMREF_DATA.

According to the embodiment of the inventive concept, the number of lookup tables is not limited to five. The number of lookup tables may be increased as necessary.

Figure 8:
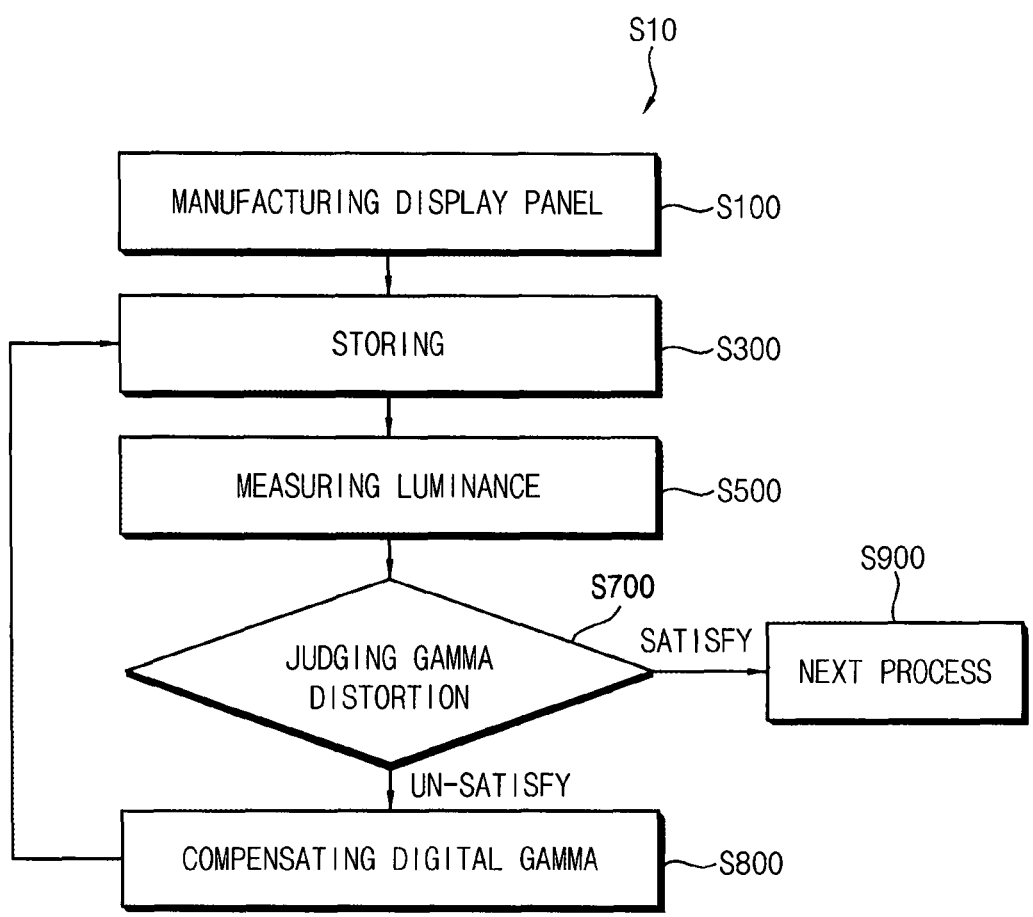
FIG. 8 is a flowchart illustrating a manufacturing process of the display apparatus of FIGS. 2 and 3.

FIG. 8 is a flowchart illustrating a manufacturing process of the display apparatus of FIGS. 2 and 3.

Referring to FIGS. 1 to 3 and 8, a manufacturing process of the display apparatus S10 may include a display panel manufacturing step S100, a storing step S300, a luminance measuring step S500, a gamma distortion judging step S700 and a digital gamma compensating step S800.

In the display panel manufacturing step S100, the display panel 100 of the display apparatus 10 is manufactured.

In the storing step S300, the memory 610 may store the basic gamma reference data, the first compensated gamma reference data and the second compensated gamma reference data.

In the luminance measuring step S500, the luminance measuring device 30 may measure a luminance of a display panel 100 and output a luminance data BR_DATA to the timing controller.

In the gamma distortion judging step S700, the luminance data BR_DATA may be compared with a gamma distortion standards. When the luminance data BR_DATA satisfies the gamma distortion standards, the display panel 100 may be delivered to a next process S900. When the luminance data BR_DATA fails to meet the gamma distortion standards, the display panel 100 may be delivered to the digital gamma compensating step S800. The digital gamma compensating step 800 is explained in detail referring to FIG. 9.

The manufacturing process of the display apparatus S10 may repeat the storing step S300, the luminance measuring step S500, the gamma distortion judging step S700 and the digital gamma compensating step S800 until the luminance data BR_DATA satisfies the gamma distortion standards in the judging a gamma distortion step S700.

Figure 9:
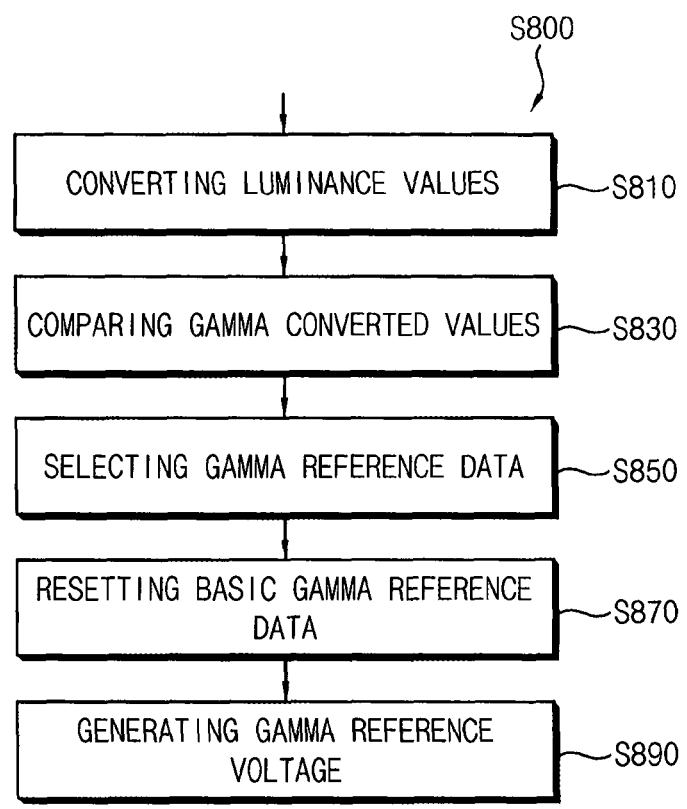
FIG. 9 is a flowchart illustrating a digital gamma compensating step of FIG. 8.

FIG. 9 is a flowchart illustrating a digital gamma compensating step of FIG. 8.

Referring to FIGS. 1 to 6, 8 and 9, the digital gamma compensating step S800 may include a step of converting the luminance values S810, a step of comparing the gamma converted values S830, a step of selecting a gamma reference data S850, a step of resetting the basic gamma reference data S870 and a step of generating the gamma reference voltage S890.

In the step of converting the luminance values S810, the convertor 631 may convert the luminance data BR_DATA to the gamma converted values. For example, the convertor 631 may convert the luminance values of the luminance data BR_DATA to the gamma converted values. The gamma converted values may include log transformed values of the luminance values.

In the step of comparing the gamma converted values S830, the comparator 633 may compare the gamma converted values with the predetermined gamma converted reference range, and may output the result of the comparison as a difference value.

In the step of selecting a gamma reference data S850, the selector 630 may output the gamma reference data GMREF_DATA by selecting one from the basic gamma reference data, the first compensated gamma reference data and the second compensated gamma reference data, based on the result of the comparison.

In the step of resetting the basic gamma reference data S870, the memory 610 may store the gamma reference data GMREF_DATA which is selected by the selector 630 as the basic gamma reference data.

In the step of generating the gamma reference voltage S890, the gamma reference voltage generator 400 may generate the gamma reference voltage VGREF based on the gamma reference data GMREF_DATA.

The gamma reference data GMREF_DATA which is included in the third control signal CONT3 may be output from the timing controller 200 to the gamma reference voltage generator 400.

In the present exemplary embodiment, the display panel 100 receives the luminance data BR_DATA in a manufacturing process. The luminance measuring device 30 may output the luminance data BR_DATA based on a luminance of a center of the display panel 100. The luminance data BR_DATA may be converted to the gamma converted values. The gamma converted values may be compared with the predetermined gamma converted reference range. The predetermined gamma converted reference range may have a predetermined range. When the gamma converted value is out of the predetermined gamma converted reference range, the gamma reference voltages VGREF may be compensated based on one of the first compensated gamma reference data and the second compensated gamma reference data. After the gamma reference voltages VGREF compensated, the luminance measuring device 30 may output the luminance data BR_DATA based on a luminance of the display panel 100 which displays an image based on the compensated gamma reference voltages VGREF. The steps listed above may be repeated until the gamma converted values satisfy the predetermined gamma converted reference range.

Figure 10:
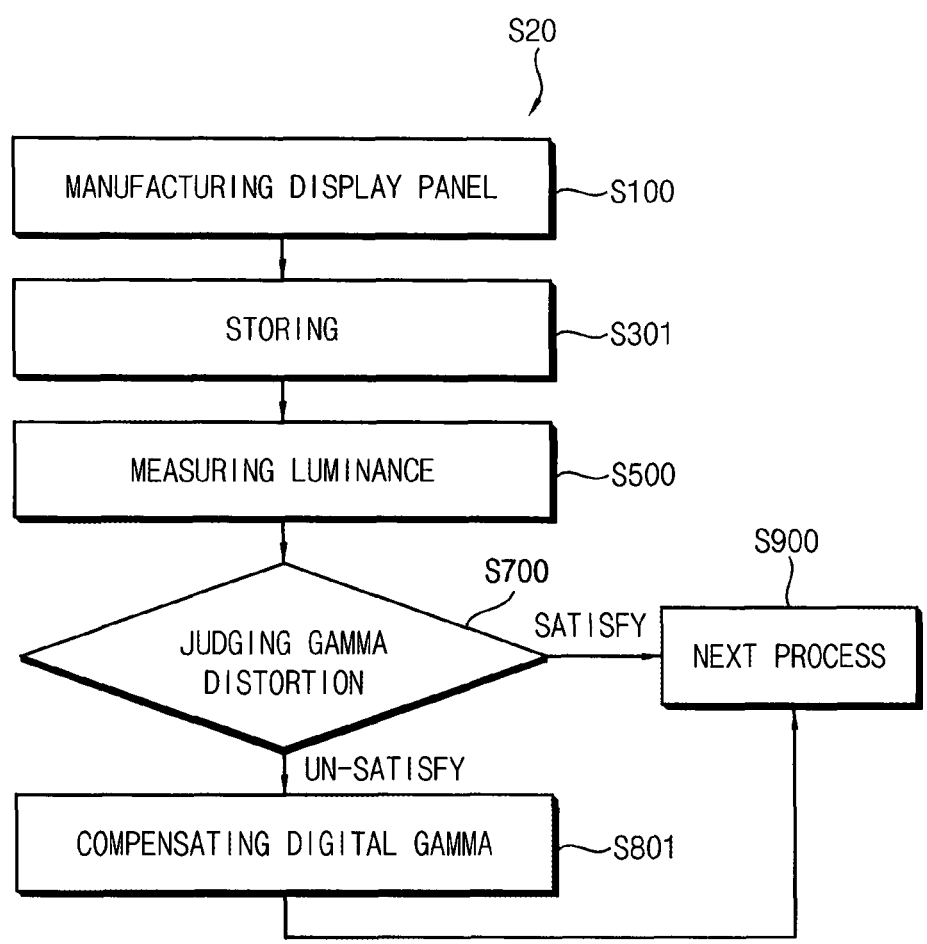
FIG. 10 is a flowchart illustrating a manufacturing process of the display apparatus of FIGS. 2 and 7.

FIG. 10 is a flowchart illustrating a manufacturing process of the display apparatus of FIGS. 2 and 7.

The manufacturing process of the display apparatus S20 according to the illustrated exemplary embodiment is substantially the same as the manufacturing process of the display apparatus S10 in FIGS. 8 and 9 except for a storing step S301 and a digital gamma compensating step S801. Thus, the same reference numerals will be used to refer to same or like parts as those described in with reference to FIGS. 8 to 9 and any further repetitive explanation concerning the above elements will be omitted.

Referring to FIGS. 1, 2, 7 and 10, a manufacturing process of the display apparatus S20 may include a display panel manufacturing step S100, a storing step S301, a luminance measuring step S500, a gamma distortion judging step S700 and a digital gamma compensating step S801.

In the storing step S301, the memory 710 may store the basic gamma reference data, the first compensated gamma reference data, the second compensated gamma reference data, the third compensated gamma reference data and the fourth compensated gamma reference data.

Unlike the manufacturing process of the display apparatus S10 illustrated in the FIG. 8, the manufacturing process of the display apparatus S20 may precede the storing step S301, the luminance measuring step S500, the gamma distortion judging step S700 and the digital gamma compensating step S801 in one cycle.

Figure 11:
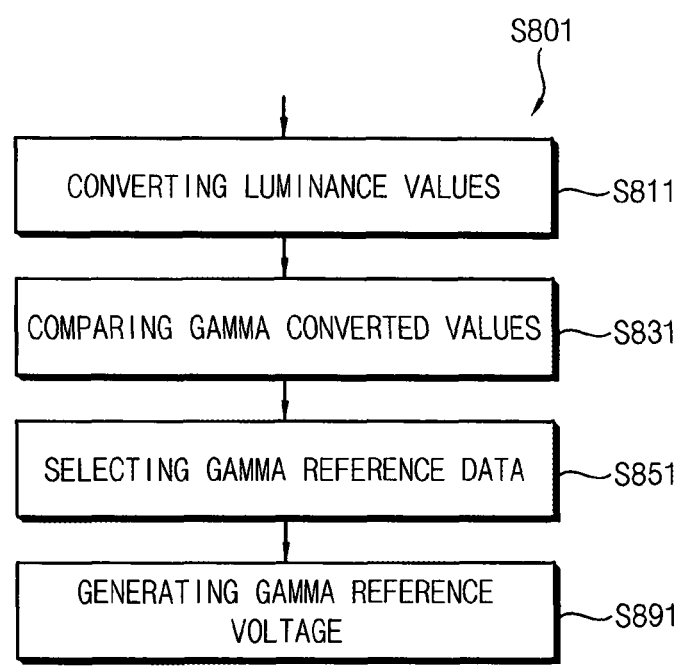
FIG. 11 is a flowchart illustrating a digital gamma compensating step of FIG. 10.

FIG. 11 is a flowchart illustrating a digital gamma compensating step of FIG. 10.

Referring to FIGS. 1, 2, 4 to 7, 10 and 11, the digital gamma compensating step S801 may include a step of converting the luminance values S811, a step of comparing the gamma converted values S831, a step of selecting a gamma reference data S851 and a step of generating the gamma reference voltage S891.

In the step of converting the luminance values S811, the convertor 731 may convert the luminance data BR_DATA to the gamma converted values. For example, the convertor 731 may convert the luminance values of the luminance data BR_DATA to the gamma converted values, respectively. The gamma converted values may include log transformed values of the luminance values.

In the step of comparing the gamma converted values S831, the comparator 733 may compare the gamma converted values with the predetermined gamma converted reference range, and may output the result of the comparison as a difference value.

In the step of selecting a gamma reference data S851, the selector 730 may output the gamma reference data GMREF_DATA by selecting one from the basic gamma reference data, the first compensated gamma reference data, the second compensated gamma reference data, the third compensated gamma reference data and the fourth compensated gamma reference data, based on the result of the comparison.

In the step of generating the gamma reference voltage S891, the gamma reference voltage generator 400 may generate the gamma reference voltage VGREF based on the gamma reference data GMREF_DATA.

The gamma reference data GMREF_DATA which is included in the third control signal CONT3 may be output from the timing controller 200 to the gamma reference voltage generator 400.

In the present exemplary embodiment, the display panel 100 receives the luminance data BR_DATA in a manufacturing process. The luminance measuring device 30 may output the luminance data BR_DATA based on a luminance of a center of the display panel 100. The luminance data BR_DATA may be converted to the gamma converted values. The gamma converted values may be compared with the predetermined gamma converted reference range. The predetermined gamma converted reference range may have a predetermined range. When the gamma converted value is out of the gamma converted reference range, the gamma reference voltages VGREF may be compensated based on one of the first compensated gamma reference data, the second compensated gamma reference data, the third compensated gamma reference data and the fourth compensated gamma reference data.

According to one or more of the illustrated exemplary embodiments, the digital gamma correction part may compensate the gamma reference data based on the luminance data BR_DATA. The gamma reference data has a digital value which corresponds to a gamma reference voltage VGREF. Thus, the digital gamma correction part may reduce a gamma distortion by software methods, so that the display quality may be improved.

A display apparatus of the illustrated exemplary embodiments may be applied to a mobile type display apparatus such as a mobile phone, a note book computer and a tablet computer, a fixed type display such as a television and a desktop display, and a display of a general appliance such as a refrigerator, a washing machine and an air conditioner.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A digital gamma correction part comprising:
   a memory configured to store a basic gamma reference data, a first compensated gamma reference data and a second compensated gamma reference data, wherein respective data of the first compensated gamma reference data are greater than respective data of the basic gamma reference data, and respective data of the second compensated gamma reference data are less than respective data of the basic gamma reference data; and
   a selector configured to receive a luminance data which is a measured luminance data of a display panel, and to output a gamma reference data by selecting one from the basic gamma reference data, the first compensated gamma reference data and the second compensated gamma reference data based on the luminance data and a predetermined gamma converted reference range,
   wherein the luminance data comprises a plurality of luminance values corresponding to grayscale levels, respectively, and the selector comprises a convertor configured to convert the luminance values to a plurality of gamma converted values, respectively, and a comparator configured to compare the gamma converted values with the predetermined gamma converted reference range, and
   wherein, when the gamma converted values are within the predetermined gamma converted reference range, the selector is configured to select the basic gamma reference data, when a minimum of the gamma converted value is less than a minimum value of the predetermined gamma converted reference range, the selector is configured to select the first compensated gamma reference data, and when a maximum gamma converted value is greater than a maximum value of the predetermined gamma converted reference range, the selector is configured to select the second compensated gamma reference data.

2. The digital gamma correction part of claim 1, wherein the gamma converted value comprises a logarithm of a first variable, the logarithm having a base of a second variable, the first variable is the luminance value divided by a maximum luminance value corresponding to a maximum level of the grayscale, and
   the second variable is the level of the grayscale divided by the maximum level of the grayscale.

3. The digital gamma correction part of claim 1, wherein the luminance data is a measured luminance data of a center of the display panel.

4. The digital gamma correction part of claim 1, wherein the selector is configured to output the gamma reference data to the memory, and
   the memory is configured to store the gamma reference data as the basic gamma reference data.

5. A display apparatus comprising:
   a display panel configured to display an image;
   a digital gamma correction part comprising:
      a memory configured to store a basic gamma reference data, a first compensated gamma reference data and a second compensated gamma reference data, wherein respective data of the first compensated gamma reference data are greater than respective data of the basic gamma reference data, and respective data of the second compensated gamma reference data are less than respective data of the basic gamma reference data; and
      a selector configured to receive a luminance data which is a measured luminance data of the display panel, and to output a gamma reference data by selecting one from the basic gamma reference data, the first compensated gamma reference data and the second compensated gamma reference data based on the luminance data and a predetermined gamma converted reference range,
   a gamma reference voltage generator configured to generate a gamma reference voltage based on the gamma reference data, and
   a data driver configured to generate a data voltage using the gamma reference voltage to output the data voltage to the display panel,
   wherein the luminance data comprises a plurality of luminance values corresponding to grayscale levels, respectively, and the selector comprises a convertor configured to convert the luminance values to a plurality of gamma converted values, respectively, and a comparator configured to compare the gamma converted values with the predetermined gamma converted reference range, and wherein, when the gamma converted values are within the predetermined gamma converted reference range, the selector is configured to select the basic gamma reference data, when a minimum of the gamma converted value is less than a minimum value of the predetermined gamma converted reference range, the selector is configured to select the first compensated gamma reference data, and when a maximum gamma converted value is greater than a maximum value of the predetermined gamma converted reference range, the selector is configured to select the second compensated gamma reference data.

6. A method of driving a display panel, the method comprising:

storing a basic gamma reference data, a first compensated gamma reference data and a second compensated gamma reference data, wherein respective data of the first compensated gamma reference data are greater than respective data of the basic gamma reference data, and respective data of the second compensated gamma reference data are less than respective data of the basic gamma reference data;

selecting a gamma reference data from the basic gamma reference data, the first compensated gamma reference data and the second compensated gamma reference data according to a luminance data which is a measured luminance data of the display panel and a predetermined gamma converted reference range; and generating a gamma reference voltage based on the gamma reference data.

wherein the luminance data comprises a plurality of luminance values corresponding to grayscale levels, respectively, and the selecting the gamma reference data comprises converting the luminance values to a plurality of gamma converted values, respectively, and comparing the gamma converted values with the predetermined gamma converted reference range, and wherein, when the gamma converted values are within the predetermined gamma converted reference range, the basic gamma reference data are selected as the gamma reference data, when a minimum of the gamma converted value is less than a minimum value of the predetermined gamma converted reference range, the first compensated gamma reference data are selected as the gamma reference data, and when a maximum gamma converted value is greater than a maximum value of the predetermined gamma converted reference range, the second compensated gamma reference data are selected as the gamma reference data.

7. The method of claim 6, wherein the gamma converted value comprises a logarithm of a first variable, the logarithm having a base of a second variable, the first variable is the luminance value divided by a maximum luminance value corresponding to a maximum level of the grayscale, and the second variable is the level of the grayscale divided by the maximum level of the grayscale.

8. The method of claim 6, further comprising resetting the basic gamma reference data in accordance with the selected gamma reference data.

9. The method of claim 8, wherein the storing the basic gamma reference data, the first compensated gamma reference data and the second compensated gamma reference data, the selecting the gamma reference data, the generating the gamma reference voltage, and the resetting the basic gamma reference data are repeated until the stored basic gamma reference data are selected as the gamma reference data.

10. The method of claim 6, wherein the luminance data is a measured luminance data of a center of the display panel.

* * * * *